(12) United States Patent
Patel et al.

(10) Patent No.: US 6,828,279 B2
(45) Date of Patent: Dec. 7, 2004

(54) BIODEGRADABLE SURFACTANT FOR INVERT EMULSION DRILLING FLUID

(75) Inventors: Arvind D. Patel, Sugarland, TX (US); Burnhan Hoxha, Houston, TX (US); Reginald Bell, Houston, TX (US)

(73) Assignee: M-I LLC, Houston, TX (US)

( * ) Notice: Subject to any disclaimer, the term of this patent is extended or adjusted under 35 U.S.C. 154(b) by 47 days.

(21) Appl. No.: 09/927,619

(22) Filed: Aug. 10, 2001

(65) Prior Publication Data

US 2003/0114316 A1 Jun. 19, 2003

(51) Int. Cl.$^7$ ................................................ C09K 7/06
(52) U.S. Cl. ...................................... 507/136; 507/138
(58) Field of Search ................................ 507/136, 138, 507/261, 265

(56) References Cited

U.S. PATENT DOCUMENTS

| | | | |
|---|---|---|---|
| 2,802,531 A | 8/1957 | Cardwell et al. ............. 166/42 |
| 2,900,336 A | 8/1959 | Brown et al. ................ 252/8.5 |
| 2,900,337 A | 8/1959 | Earley et al. ................ 252/8.5 |
| 3,728,277 A | 4/1973 | Foley ....................... 252/309 |
| 3,804,760 A | 4/1974 | Darley ..................... 252/8.55 |
| 3,962,151 A | 6/1976 | Dekker et al. ............. 252/548 |
| 4,040,866 A | 8/1977 | Mondshine .................. 134/26 |
| 4,230,586 A | 10/1980 | Bretz et al. ................ 252/8.5 |
| 4,439,345 A | 3/1984 | Duke ........................ 252/330 |
| 4,464,269 A * | 8/1984 | Walker et al. ............. 507/261 |
| 4,582,543 A | 4/1986 | Bretz ........................ 148/250 |
| 4,615,813 A | 10/1986 | Bretz ..................... 252/8.514 |
| 4,645,608 A | 2/1987 | Rayborn .................. 252/8.51 |
| 4,670,550 A | 6/1987 | Bleeker et al. ............. 536/114 |
| 4,735,731 A | 4/1988 | Rose et al. ............... 252/8.51 |
| 4,747,969 A | 5/1988 | Rupilius et al. ............ 260/415 |
| 4,830,765 A | 5/1989 | Perricone et al. .......... 252/8.51 |
| 4,941,981 A | 7/1990 | Perricone et al. .......... 252/8.51 |
| 4,963,273 A | 10/1990 | Perricone et al. .......... 252/8.51 |
| 4,964,615 A | 10/1990 | Mueller et al. ........... 252/8.551 |
| 5,057,234 A | 10/1991 | Bland et al. ................ 252/8.51 |
| 5,072,794 A | 12/1991 | Hale et al. .................... 175/50 |
| 5,120,708 A | 6/1992 | Melear et al. .............. 507/126 |
| 5,156,686 A | 10/1992 | Van Slyke ................... 134/26 |
| 5,189,012 A | 2/1993 | Patel et al. ................. 507/103 |
| 5,254,531 A | 10/1993 | Mueller et al. ............. 507/131 |
| 5,380,469 A * | 1/1995 | Flider ......................... 252/565 |
| 5,403,820 A | 4/1995 | Walker ....................... 507/110 |
| 5,424,469 A * | 6/1995 | Jakobson et al. ........... 554/227 |
| 5,466,719 A * | 11/1995 | Jakobson et al. ........... 514/785 |
| H1611 H | 11/1996 | Patel .......................... 507/103 |
| 5,634,984 A | 6/1997 | Van Slyke .................... 134/40 |
| 5,977,031 A | 11/1999 | Patel .......................... 507/138 |

FOREIGN PATENT DOCUMENTS

| | | | | |
|---|---|---|---|---|
| CA | 2068129 | 7/1992 | ............ C09K/5/00 |
| DE | 2462436 A1 | 2/1977 | ............ C10M/3/30 |
| DE | 3842703 A1 | 6/1990 | ............ C09K/7/06 |
| DE | 3903784 A1 | 6/1990 | |
| EP | 0137538 A2 | 4/1985 | ............ C09K/7/06 |
| EP | 0226250 A2 | 6/1987 | ............ C08J/3/08 |
| EP | 0271943 A2 | 6/1988 | ............ C09K/7/02 |
| EP | 0382070 A1 | 9/1989 | ............ C09K/7/06 |
| EP | 0382071 | 1/1990 | ............ C09K/7/06 |
| EP | 0386636 A1 | 3/1990 | |
| EP | 0386638 | 3/1990 | ............ C09K/7/06 |
| EP | 374671 A1 | 6/1990 | ............ C09K/7/06 |
| EP | 0382318 A1 | 8/1990 | ............ B01F/17/16 |
| EP | 449257 A2 | 10/1991 | ............ C09K/7/06 |
| EP | 495579 A3 | 7/1992 | ............ C09K/7/02 |
| EP | 0652271 | 5/1995 | ............ C09K/7/00 |
| EP | 730018 A | 9/1996 | ............ C09K/7/02 |
| FR | 1441299 | 4/1966 | |
| GB | A 751191 | 6/1956 | |
| GB | 2195685 A | 12/1988 | ............ C09K/7/06 |
| GB | 2223255 | 4/1990 | ............ C09K/7/06 |
| GB | 2251447 | 7/1992 | ............ C09K/7/06 |
| GB | 2252993 | 8/1992 | ............ C09K/7/06 |
| GB | 2283036 | 4/1995 | ............ C09K/7/02 |
| WO | WO87/02692 | 5/1987 | ............ C09K/7/00 |
| WO | WO89/01491 | 2/1989 | ............ C07K/7/00 |
| WO | WO90/06890 | 6/1990 | |
| WO | WO90/06981 | 6/1990 | ............ C09K/7/06 |
| WO | WO92/22622 | 12/1992 | ............ C09K/7/06 |
| WO | WO93/16145 | 8/1993 | ............ C09K/7/06 |
| WO | WO93/23491 | 11/1993 | ............ C09K/7/06 |
| WO | WO94/16030 | 7/1994 | ............ C09K/7/06 |
| WO | WO95/17244 | 6/1995 | ............ B01F/17/00 |
| WO | 96/18383 | * 6/1996 | |
| WO | WO96/19545 | 6/1996 | ............ C09K/7/06 |

OTHER PUBLICATIONS

Kirk–Othmer, "Encyclopedia of Chemical Technology", Third Edition, vol. 1, A to Alkanolamines, pp. 944–960, 1978.

Dickey, Parke A.; Petroleum Development Geology, pp. 57–83, 2nd Ed.; Penn Well Books before 1988.

(List continued on next page.)

Primary Examiner—Philip C. Tucker
(74) Attorney, Agent, or Firm—Howrey Simon Arnold & White LLP

(57) ABSTRACT

An invert emulsion drilling fluid includes an oleaginous continuous phase; a non-oleaginous discontinuous phase; a biodegradable surfactant including a di-fatty acid ester of triglycerol; and a weighting agent. It is preferred that the fatty acid have the formula $RCO_2H$ in which R is an alkyl or alkenyl having 10 to 20 carbon atoms. The oleaginous fluid is selected from diesel oil, mineral oil, synthetic oil, ester oils, glycerides of fatty acids, aliphatic esters, aliphatic ethers, aliphatic acetals, or other such hydrocarbons and combinations of these and similar compounds. The non-oleaginous phase is selected from fresh water, sea water, brine, aqueous solutions containing water soluble organic salts, water soluble alcohols or water soluble glycols or combinations of these and similar compounds. The weighting agent is any suitable weighting agent and is preferably selected from water insoluble weighting agents such as barite, calcite, mullite, gallena, manganese oxides, iron oxides, or combinations of these or water soluble weighting agents such as water soluble salts of zinc, iron, barium, calcium or combinations of these and similar compounds.

19 Claims, No Drawings

OTHER PUBLICATIONS

"Fine and Functional Chemcials", Nitrogen Derivatives, AKZO General Catalog. Copyright 1990.
"Quaternary Ammonium Compounds", Fine and Functional Chemicals, AKZO Catalog. Copyright 1990.
The Dow Chemical Company; The Glycol Ethers Handbook, Oct. 1993.
Aldrich Katalog Handbuch Feinchemikalien, Aldrich GmbH & Co. KG, Steinheim, p. 557, DE 1994.
The Dow Chemical Company; Physical Properties of Dow-Anol Glycol Ethers and Acetates; table; Jun. 1995.
The Dow Chemical Company; Product Information—Dowanol DPNB, Apr. 1997.
The Dow Chemical Company; Product Information—Dowanol PNB, Apr. 1997.
Chemical Abstracts Search, 35 pages, Apr. 2, 1997.
STN International Search, Chemical Abstracts and World Patent Index, 41 pages, Apr. 9, 1997.
Lexis Search, Citation List, 4 pages, May 1, 1997.
The Dow Chemical Company; Material Safety Data Sheet, Oct. 20, 1997.
Chemical Abstract Services Search Report, Oct. 27, 1997.
P. A. Boyd, et al., "New Base Oil Used in Low–Toxicity Oil Muds", Journal of Petroleum Technology, 1985, 137 to 142.
R. B. Bennett, "New Drilling Fluid Technology–Mineral Oil Mud", Journal of Petroleum Technology, 1984, 975 to 981.
"Composition and Properties of Drilling and Completion Fluids", $5^{th}$ Edition, H.C.H. Darley, George R. Gray, Gulf Publishing Company, 1988, pp. 116, 166, 328–332.
Akzo Nobel Chemicals Surface Chemistry Products, www.surface.akzonobel.com/p/index.htm.

* cited by examiner

US 6,828,279 B2

BIODEGRADABLE SURFACTANT FOR INVERT EMULSION DRILLING FLUID

BACKGROUND OF THE INVENTION

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase. Pneumatic fluids are a third class of drilling fluids in which a high velocity stream of air or natural gas removes drill cuttings.

Invert emulsion fluids, i.e. emulsions in which the non-oleaginous fluid is the discontinuous phase and the oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein. Also reference is made to the description of invert emulsions found in *Composition and Properties of Drilling and Completion Fluids*, 5th Edition, H. C. H. Darley, George R. Gray, Gulf Publishing Company, 1988, pp. 328–332, the contents of which are hereby incorporated by reference.

The emulsifying agent component of the invert emulsion drilling fluid serves to lower the interfacial tension of the liquids so that the non-oleaginous liquid may form a stable dispersion of from droplets in the oleaginous liquid. As used herein, emulsifying agent and surfactant are used interchangeably. Typically emulsifying agents are chemical compounds that are polar on one portion of the molecule and non-polar on another area Such characteristics allow the emulsifying agent to be slightly soluble in both the oleaginous phase and the non-oleaginous phase and thus found at the interfacial surfaces between the two. Because of the unique characteristics of such compounds, the biodegradability is limited. In some cases, the surfactant molecules are toxic to the biodegrading organism.

As a result of the above, there remains and exists an unmet need for a surfactant package that can be used to formulate invert emulsion drilling fluids and yet remain biodegradable.

SUMMARY OF THE INVENTION

The present invention is generally directed to an invert emulsion drilling fluid that is formulated using a biodegradable surfactant. As disclosed below, such a fluid includes: an oleaginous continuous phase, a non-oleaginous discontinuous phase, a surfactant that is a fatty acid ester of diglycerol or triglyccrol, and a weighting agent. In one such illustrative embodiment, the surfactant is a di-fatty acid ester of diglycerol in which the fatty acid has the formula $RCO_2H$ and R is an alkyl or alkenyl having 10 to 20 carbon atoms. Alternatively, the surfactant is a di-fatty acid ester of triglycerol in which the fatty acid has the formula $RCO_2H$ and the R is an alkyl or alkenyl having 10 to 20 carbon atoms. More preferably the surfactant is selected from polyglyceryl-2 diisostearate or polyglyceryl-3 diisostearate or mixtures and combinations of these. One of skill in the art should appreciate that the oleaginous fluid may be selected from a wide variety of suitable materials. Examples include: diesel oil, mineral oil, synthetic oil, ester oils, glycerides of fatty acids, aliphatic esters, aliphatic ethers, aliphatic acetals, or other such hydrocarbons and combinations and mixtures of these and similar fluids. In a similar manner, the non-oleaginous phase may be selected from a wide variety of suitable materials. Examples of which include: fresh water, sea water, brine, aqueous solutions containing water soluble organic salts, water soluble alcohols or water soluble glycols or combinations and mixtures of these and similar fluids. The weighting agent component of such an illustrative drilling fluid can be either a water-soluble weighting agent or a water insoluble weighting agent or combinations and mixtures of these two. In one illustrative embodiment, the water insoluble weighting agent is selected from barite, calcite, mullite, gallena, manganese oxides, iron oxides, or combinations and mixtures of these and similar solid materials used to weight drilling fluids. In another illustrative embodiment, the water soluble weighting agent is selected from water soluble salts of zinc, iron, barium, calcium or combinations and mixtures of these in aqueous solutions used to add weight to drilling fluids.

Also encompassed by the present invention are the methods of formulating such fluids and using such fluids in the drilling of subterranean wells. For example in one such embodiment, a drilling fluid as described below is formulated, circulated in a rotary drilling drill string and utilized as the drilling fluid in drilling a well. 1These and other features of the present invention are more fully set forth in the following description of preferred or illustrative embodiments of the invention.

DESCRIPTION OF ILLUSTRATIVE EMBODIMENTS

The present invention is generally directed to invert emulsion drilling fluids and their use in the drilling of subterranean wells. The invert emulsion fluids of the present invention generally are composed of an oleaginous continuous phase, a non-oleaginous discontinuous phase, a surfactant that is a fatty acid ester of diglycerol or triglycerol, and a weighting agent.

As used herein the term "oleaginous liquid" means oil which is a liquid at 25° C. and immiscible with water. Oleaginous liquids typically include substances such as diesel oil, mineral oil, synthetic oil such as polyolefins or isomerized polyolefins, ester oils, glycerides of fatty acids, aliphatic esters, aliphatic ethers, aliphatic acetals, or other such hydrocarbons and combinations of these fluids. In one illustrative embodiment of this invention the oleaginous liquid is an polyolefin material which provides environmental degradability to the overall drilling fluid. Such polyolefins should be selected such that the molecular weight permits for a functional invert emulsion drilling fluid to be formulated. Especially preferred are isomerized polyolefins having a carbon backbone of 16 to 18 carbons and in which at least one point of unstaturation is internal.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25° C. and which is not an oleaginous liquid as defined above. Non-oleaginous liquids are immiscible with oleaginous liquids but capable of forming emulsions therewith. Typical non-oleaginous liquids include aqueous substances such as fresh water, seawater, brine containing inorganic or organic dissolved salts, aqueous solutions containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

As the term is used herein, "surfactant" and "emulsifier" or "emulsifying agent" are used interchangeably to indicate that component of the invert emulsion drilling fluid that stabilizes the invert emulsion. One of ordinary skill in the art should appreciate that such a compound acts at the interface of the oleaginous and the non-oleaginous fluids and lowers the differences in surface tension between the two layers. In the present invention it is important that the emulsifying agent does not adversely affect the biodegradability of the invert emulsion. The ability of any particular emulsifying agent to stabilize the invert emulsion can be tested by using the invert emulsion test disclosed below. In addition if the emulsifying agent is to be useful in the formulation of a drilling fluid, the emulsifier should be thermally stable. That is to say, the emulsifier must not break down or chemically degrade upon heating to temperatures typically found in a downhole environment. This may be tested by heat aging the emulsifier as is done in the Examples.

Typically prior art emulsion compounds are difficult or are very slow to biodegrade. However, it has been found that fatty acid esters of diglycerol or triglycerol function as surfactants that are readily biodegradable. In one preferred embodiment of the present invention, the surfactant is a di-fatty acid ester of diglycerol in which the fatty acid has the formula $RCO_2H$ and the R is an alkyl or alkenyl having 10 to 20 carbon atoms. Alternatively, the surfactant is a di-fatty acid ester of triglycerol in which the fatty acid has the formula $RCO_2H$ and the R is an alkyl or alkenyl having 10 to 20 carbon atoms. As illustrated in the examples below, it is especially preferred that the surfactant is a polyglyceryl-2 diisostearate or polyglyceryl-3 diisostearate or mixtures of these. A suitable emulsifier within the scope of the present invention should be capable of stabilizing the invert emulsion under conditions of heat aging. The amount of the emulsifier needed to form a stable invert emulsion can be determined by systematically adjusting the amount of emulsifier added and testing the stability of the fluid. Preferably the amount of emulsifier should be from about 1 to about 20 pounds per barrel (ppb) and more preferably from about 8 to about 12 ppb of the drilling fluid.

The invert emulsion drilling fluids preferably contain weight materials. The quantity and nature of the weight material depends upon the desired density and viscosity of the final composition The preferred weight materials include, but are not limited to, barite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon.

Viscosifying agents, for example, organophillic clays, may optionally be employed in the invert drilling fluid compositions of the present invention. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight to volume of the total fluid. VG-69™ and VG-PLUS™ are organoclay materials and Versa HRP™ is a polyamide resin material manufactured and distributed by M-I L.L.C. which are suitable viscosifying agents.

Fluid loss control agents such as modified lignite, polymers, oxidized asphalt and gilsonite may also be added to the invert drilling fluids of this invention. Usually such fluid loss control agents are employed in an amount, which is at least about 0.1, preferably at least about 1, more preferably at least about 5 percent, by weight to volume of the total fluid.

One skilled in the art may readily identify using the following test if he has used the appropriate ingredients and amounts to form an invert emulsion:

INVERT EMULSION TEST: A small portion of the emulsion is placed in a beaker which contains an oleaginous fluid. If the emulsion is an invert emulsion, the small portion of the emulsion will disperse in the oleaginous fluid. Visual inspection will determine if it has so dispersed.

Alternatively, the electrical stability of the invert emulsion may be tested using a typical emulsion stability tester. Generally the voltage applied across two electrodes is increased until the emulsion breaks and a surge of current flows between the two electrodes. The voltage required to break the emulsion is a common measure of the stability of such an emulsion. Other tests are described on page 166 of the book, *Composition and Properties of Drilling and Completion Fluids*, 5th Edition, H. C. H. Darley and George Gray, Gulf Publishing Company, 1988, the contents of which are hereby incorporated by reference.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

The following examples are submitted for the purpose of illustrating the performance characteristics of the drilling fluid compositions of this invention. These tests were conducted substantially in accordance with the procedures in API Bulletin RP 13B-2, 1990 which is incorporated herein by reference. The following abbreviations may be used in describing the results of experimentation:

"E.S." is electrical stability of the emulsion as measured by the test described in *Composition and Properties of Drilling and Completion Fluids*, 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity that is one variable used in the calculation of viscosity characteristics of a drilling fluid, measured in centipoise (cP) units.

"YP" is yield point that is another variable used in the calculation of viscosity characteristics of drilling fluids, measured in pounds per 100 square feet (lb/100 ft).

"AV" is apparent viscosity that is another variable used in the calculation of viscosity characteristic of drilling fluid, measured in centipoise (cP) units. "GELS" is a measure of the suspending characteristics, or the thixotropic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss at 200° F., measured in milliliters (ml) according to API bulletin RP 13 B-2, 1990.

As used in the formulation of the drilling fluids illustrated in the following example the following component names are intended to mean the following:

IO $C_{16-18}$ is a isomerized olefin used as a synthetic based drilling fluid available commercially as Amodril-1000 from Amoco Co.

Bio Base-300 is a mixture of blended linear parafin (93%) and olefin available commercially from Shrieve Chemicals Co.

BENTONE 38 is an organophillic clay viscosifying agent available commercially from M-I LLC of Houston, Tex.

MI Bar is a barite based weighting agent available commercially from M-I LLC of Houston Tex.

Emulpharma PG20 is a emulsifier available commercially from RES Pharma of Italy.

VERSAWET is a wetting agent available commercially from M-I LLC of Houston Tex.

VERSAVERT F is a fluid loss control agent available commercially from M-I LLC of Houston Texas.

VERSA SWA is a wetting agent available commercially from M-I LLC of Houston Tex.

VERSAMOD is a LSRV agent available commercially from M-I LLC of Houston Tex.

BENTONE (EMI 155), is a viscosifier available from M-I LLC of Houston Tex.

ARM 1–73A is a choline chloride emulsifier available commercially from Special Product Co. of Houston, Tex.

Ecotrol (EMI-526) is a fluid loss control agent available commercially from M-I LLC of Houston, Tex.

VG PLUS is a viscosifier available commercially from M-A LLC of Houston Tex.

NOVA PLUS is a synthetic mud system available commercially from M-I LLC of Houston Tex.

NOVAMUL is a emulsifing agent used with the NOVA PLUS system available commercially from M-I LLC of Houston Tex.

NOVAWET is a wetting agent used with the NOVA PLUS system available commercially from M-I LLC of Houston Tex.

VERSACOAT is a primary emulsifing agent available commercially from M-I LLC of Houston Tex.

Lime is commercially acceptable grade of calcium hydroxide commonly available.

$CaCl_2$ (95%), is an aqueous calcium chloride solution having 95% by weight calcium choride.

REV DUST is a simulated drill cuttings material available from M-I LLC of Houston, Tex.

Class G Cement is a Portland cement formulated for use in cementing subterranean wells that is commercially available.

Zechstein brine is an aqueous brine solution containing 50% w/v magnesium chloride, 0.038 w/v potassium chloride; 0.026 w/v sodium chloride; 0.63 v/v deionized water.

All values associated with the formulations described below are grams unless otherwise specified.

EXAMPLE 1

Drilling Fluid with 25% $CaCl_2$ Brine

A drilling fluid of the present invention was formulated to contain the following:

|  | Fluid Formulation A |
|---|---|
| IO $C_{16-18}$, g | 173.7 |
| BENTONE 38, g | 7.0 |
| Lime, g | 2.0 |
| Emulpharma PG20, g | 8.0 |
| Tapwater, g | 54.3 |
| $CaCl_2$ (95%), g | 18.1 |
| $CaCO_3$, g | 35 |
| MI Bar, g | 208.9 |

The formulated fluid had a mud weight of about 11.8 ppg. The initial properties of the fluid were measured and then the fluid was aged at 200° F. for 16 hours with rolling. Rheology of the initial fluid and the aged fluid were measured at 120° F. Representative data is given below:

| | Fluid Properties | |
|---|---|---|
| | Initial | Aged |
| 600 rpm Rheology | 65 | 73 |
| 300 rpm Rheology | 42 | 49 |
| 200 rpm Rheology | 32 | 37 |
| 100 rpm Rheology | 23 | 24 |
| 6 rpm Rheology | 11 | 4 |
| 3 rpm Rheology | 9 | 3 |
| PV., cP | 23 | 24 |
| YP, lb/100 Ft$^2$ | 19 | 25 |
| 10 s. Gel, lb/100 ft$^2$ | 11 | 3 |
| 10 min, Gel, lb/100 t$^2$ | 13 | 8 |
| HTHP @ 250° F., cc/30 | 8 | 0.8 |
| ES @ 120° F., Volts | 267 | 609 |

The ability of the above fluid to withstand contamination was tested by adding Zechstein (43 g) or a slurry of class G cement (70 g) to the initial unaged drilling fluid. After aging the fluid . The fluid mixture was aged at 200° F. for 16 hours with rolling. Rheology of the initial fluid and the aged fluid were measured at 120° F. Representative data is given below:

| Fluid Properties | Zechstein (43 g) | Class G Cement (70 g slurry) |
|---|---|---|
| 600 rpm Rheology | 59 | 85 |
| 300 rpm Rheology | 37 | 59 |
| 200 rpm Rheology | 28 | 36 |
| 100 rpm Rheology | 19 | 22 |
| 6 rpm Rheology | 8 | 4 |
| 3 rpm Rheology | 6 | 3 |
| PV., cP | 22 | 26 |
| YP, lb/100 Ft$^2$ | 15 | 33 |
| 10 s. Gel, lb/100 ft$^2$ | 8 | 4 |
| 10 min, Gel, lb/100 t$^2$ | 11 | 11 |
| HTHP @ 250° F., cc/30 | 3.6 | 1.4 |
| ES @ 120° F., Volts | 439 | 305 |

Upon review of the above data, one of ordinary skill in the art should appreciate that the above formulated fluid is useful as an invert emulsion drilling fluid. Further, the fluid retains the properties required of a drilling fluid upon contamination by simulated contamination by Zechstein or a slurry of Class G cement.

EXAMPLE 2

Drilling Fluid with 25% CaCl$_2$ Brine

A drilling fluid of the present invention was formulated to contain the following:

| | Fluid Formulation B |
|---|---|
| Bio Base-300, g | 173.4 |
| BENTONE 38, g | 9.0 |
| Lime, g | 2.0 |
| Emulpharma PG20, g | 8.0 |
| VERSA WET, g | 1.0 |
| Tapwater, g | 54.3 |

-continued

| | Fluid Formulation B |
|---|---|
| CaCl$_2$ (95%), g | 18.1 |
| CaCO$_3$, g | 35 |
| MI Bar, g | 208.9 |

The formulated fluid had a mud weight of about 11.8 ppg. The initial properties of the fluid were measured and then the fluid was aged Rheology of the initial fluid and the aged fluid were measured at 120° F. The ability of the above fluid to withstand contamination was tested by adding a slurry of class G cement (70 g) or REV DUST (50 g) to the initial unaged drilling fluid. The fluid mixture was aged at 200° F. for 16 hours with rolling. Rheology of the initial fluid and the aged fluid were measured at 120° F. Representative data is given below:

| Class G Cement % v/v | 10 (70 g slurry) | |
|---|---|---|
| REV DUST, % w/w | | 5 (50 g) |
| Fluid Properties | Aged | Aged |
| 600 rpm | 119 | 41 |
| 300 | 78 | 24 |
| 200 | 60 | 15 |
| 100 | 42 | 10 |
| 6 | 17 | 3 |
| 3 | 15 | 2 |
| PV., cP | 41 | 17 |
| YP, lb/100 Ft$^2$ | 37 | 7 |
| 10 s. Gel, lb/100 ft$^2$ | 17 | 2 |
| 10 min, Gel, lb/100 t$^2$ | 19 | 6 |
| HTHP @ 250° F., cc/30 | 8.6 | 1.0 |
| ES @ 120° F., Volts | 126 | 170 |

Upon review of the above data, one of ordinary skill in the art should appreciate that the above formulated fluid is useful as an invert emulsion drilling fluid. Further, the fluid retains the properties required of a drilling fluid upon contamination by simulated contamination by a slurry of Class G cement or Rev Dust as a simulated drilling cuttings solid.

EXAMPLE 3

Drilling Fluid with 25% CaCl$_2$ Brine

A drilling fluid of the present invention was formulated to contain the following:

| | Fluid Formulation | | | | |
|---|---|---|---|---|---|
| | C | D | E | F | G |
| Bio Base | 173.7 | 173.7 | 173.7 | 173.7 | 173.7 |
| BENTONE 38, g | — | 9.0 | — | 12.0 | 9.0 |
| BENTONE (EMI 155), g | 9.0 | — | 9.0 | — | — |
| Lime, g | 2.0 | 2.0 | 2.0 | 2.0 | 2.0 |
| Emulpharma PG20, g | — | 10.0 | 10.0 | 10.0 | 10.0 |
| ARM 1-73A, g | 13.0 | — | — | — | — |
| VERSA WET g | 1.0 | 1.0 | 1.0 | 1.0 | 1.0 |

-continued

| | Fluid Formulation | | | | |
|---|---|---|---|---|---|
| | C | D | E | F | G |
| Ecotrol | | | | | 0.5 |
| Tap water, g | 54.3 | 54.3 | 54.3 | 54.3 | 54.3 |
| CaCl$_2$ (25%), g | 18.1 | 18.1 | 18.1 | 18.1 | 18.1 |
| CaCO$_3$, g | 35 | 35 | 35 | 35 | 35 |
| MI Bar, g | 208.9 | 208.9 | 208.9 | 208.9 | 208.9 |

The formulated fluid had a mud weight of about 11.8 ppg. The initial properties of the fluid were measured and then the fluid was aged at the temperatures shown for 16 hours with rolling. Rheology of the initial fluid and the aged fluid were measured at 120° F. Representative data is given below:

| | Fluid Formulation | | | |
|---|---|---|---|---|
| | C | | D | |
| | Fluid Properties | | | |
| | Initial | Aged | Initial | Aged |
| | | Aged Temp ° F. | | |
| | | 200 | | 300 |
| 600 rpm Rheology | Too thick to | | 45 | Too thick to |
| 300 rpm Rheology | measure | | 30 | measure |
| 200 rpm Rheology | | | 20 | |
| 100 rpm Rheology | | | 14 | |
| 6 rpm Rheology | | | 6 | |
| 3 rpm Rheology | | | 5 | |
| PV., cP | | | 15 | |
| YP, lb/100 Ft$^2$ | | | 15 | |
| 10 s. Gel, lb/100 ft + | | | 6 | |
| 10 min, Gel, lb/100 t$^2$ | | | 9 | |
| HTHP @ 250° F., cc/30 | | | — | |
| ES @ 120° F., Volts | | | 775 | |

| | Fluid Formulation | | | | | |
|---|---|---|---|---|---|---|
| | E | | F | | G | |
| | Fluid Properties | | | | | |
| | Initial | Aged | Initial | Aged | Initial | Aged |
| Aged Temp ° F. | | 250 | | 300 | | 300 |
| 600 rpm Rheology | 65 | 56 | 61 | 44 | 43 | 138 |
| 300 rpm Rheology | 44 | 31 | 42 | 25 | 30 | 100 |
| 200 rpm Rheology | 33 | 20 | 33 | 18 | 20 | 83 |
| 100 rpm Rheology | 25 | 11 | 25 | 10 | 15 | 60 |
| 6 rpm Rheology | 12 | 3 | 12 | 3 | 7 | 12 |
| 3 rpm Rheology | 11 | 2 | 11 | 2 | 6 | 10 |
| PV., cP | 11 | 25 | 19 | 19 | 13 | 38 |
| YP, lb/100 Ft$^2$ | 22 | 6 | 23 | 6 | 17 | 62 |
| 10 s. Gel, lb/100 ft + | 12 | 2 | 12 | 2 | 7 | 8 |
| 10 min, Gel, lb/100 t$^2$ | 14 | 6 | 15 | 3 | 9 | 11 |
| HTHP @ 250° F., cc/30 | — | 4.4 | — | 10 | — | 5.6 |
| ES @ 120° F., Volts | 649 | 471 | 617 | 325 | 711 | 388 |

Upon review of the above data, one of ordinary skill in the art should appreciate that the above-formulated fluids are useful as an invert emulsion drilling fluids. Further, in formulation D the mud was too thick to measure after aging. In formulations E & F light senerises effect was observed.

EXAMPLE 4

Drilling Fluid with 25% CaCl$_2$ Brine

A drilling fluid of the present invention was formulated to contain the following:

| | Fluid Formulation | | | | |
|---|---|---|---|---|---|
| | H | I | J | K | L |
| Bio Base-300, g | 173.7 | 173.7 | 173.7 | 173.7 | 173.7 |
| BENTONE 38, g | 12.0 | — | 7.0 | 9.0 | 12.0 |
| BENTONE (EMI 155), g | — | 9.0 | — | — | — |
| Lime, g | 2 | 2 | 2 | 2 | 2 |
| Emulpharma PG20, g | 10.0 | 10.0 | 10.0 | 10.0 | 10.0 |
| VERSA WET, g | 1.0 | 1.0 | 1.0 | 1.0 | 1.0 |
| Ecotrol(EMI-526), g | 0.5 | | 0.5 | 0.25– | — |
| Tap water, g | 54.3 | 54.3 | 54.3 | 54.3 | 54.3 |
| CaCl$_2$ (95%), g | 18.1 | 18.1 | 18.1 | 18.1 | 18.1 |
| CaCO$_3$, g | 35 | 35 | 35 | 35 | 35 |
| MI Bar, g | 208.9 | 208.9 | 208.9 | 208.9 | 208.9 |

The formulated fluid had a mud weight of about 11.8 ppg. The initial properties of the fluid were measured and then the fluid was aged at 300° F. shown for 16 hours with rolling. Rheology of the initial fluid and the aged fluid were measured at 120° F. Representative data is given below:

| | Fluid Formulation | | | | | |
|---|---|---|---|---|---|---|
| | H | | I | | J | |
| | Fluid Properties | | | | | |
| | Initial | Aged | Initial | Aged | Initial | Aged |
| 600 rpm Rheologies | 60 | 138 | 64 | 47 | 34 | 86 |
| 300 rpm Rheologies | 42 | 92 | 42 | 27 | 22 | 58 |
| 200 rpm Rheologies | 32 | 79 | 32 | 19 | 16 | 45 |
| 100 rpm Rheologies | 24 | 53 | 24 | 12 | 11 | 32 |
| 6 rpm Rheologies | 12 | 15 | 12 | 4 | 6 | 12 |
| 3 rpm Rheologies | 11 | 12 | 10 | 2 | 5 | 10 |
| PV., cP | 18 | 46 | 22 | 20 | 12 | 28 |
| YP, lb/100 Ft$^2$ | 24 | 46 | 20 | 7 | 10 | 30 |
| 10 s. Gel, lb/100 ft$^2$ | 11 | 13 | 10 | 4 | 6 | 12 |
| 10 min, Gel, lb/100 t$^2$ | 14 | 16 | 12 | 6 | 8 | 14 |
| HTHP @ 250° F., cc/30 | — | 5.6 | — | 9.2 | — | 5.2 |
| ES @ 120° F., Volts | 791 | 421 | 673 | 198 | 626 | 522 |

| | Fluid Formulation | | |
|---|---|---|---|
| | K | | L |
| | Fluid Properties | | |
| | Initial | Aged | Aged |
| 600 rpm Rheologies | 45 | 60 | 154 |
| 300 rpm Rheologies | 31 | 35 | 110 |
| 200 rpm Rheologies | 23 | 26 | 91 |
| 100 rpm Rheologies | 16 | 16 | 68 |
| 6 rpm Rheologies | 8 | 4 | 28 |
| 3 rpm Rheologies | 7 | 2 | 25 |
| PV., cP | 14 | 25 | 44 |

-continued

| | Fluid Formulation | | |
|---|---|---|---|
| | K | | L |
| | Fluid Properties | | |
| | Initial | Aged | Aged |
| YP, lb/100 Ft$^2$ | 17 | 10 | 66 |
| 10 s. Gel, lb/100 ft$^2$ | 8 | 3 | 22 |
| 10 min, Gel, lb/100 t$^2$ | 11 | 4 | 26 |
| HTHP @ 250° F., cc/30 | — | 5.0 | 14.0 |
| ES @ 120° F., Volts | 710 | 361 | 252 |

Upon review of the above data, one of ordinary skill in the art should appreciate that the above-formulated fluids are useful as an invert emulsion drilling fluids.

The formulated fluid had a mud weight of about 11.8 ppg. Exemplary contaminates were added to each of the fluid formulations in an amount indicated. The initial properties of the fluid were measured and then the fluid was aged at 300° F. shown for 16 hours with rolling. Rheology of the initial fluid and the aged fluid were measured at 120° F. Representative data is given below:

| | Formulation | | | | | | | | |
|---|---|---|---|---|---|---|---|---|---|
| | M | N | | O | | P | | Q | |
| | Fluid Properties | | | | | | | | |
| | Aged | Initial | Aged | Initial | Aged | Initial | Aged | Initial | Aged |
| 600 rpm Rheology | 151 | 30 | 88 | 37 | 61 | 42 | 125 | 45 | 37 |
| 300 rpm Rheology | 112 | 22 | 56 | 25 | 34 | 29 | 88 | 29 | 23 |
| 200 rpm Rheology | 96 | 15 | 45 | 16 | 24 | 20 | 72 | 20 | 16 |
| 100 rpm Rheology | 73 | 11 | 31 | 11 | 14 | 14 | 52 | 14 | 11 |
| 6 rpm Rheology | 28 | 5 | 10 | 3 | 3 | 6 | 12 | 6 | 4 |
| 3 rpm Rheology | 22 | 4 | 8 | 2 | 2 | 5 | 12 | 5 | 3 |
| PV., cP | 39 | 12 | 32 | 12 | 27 | 13 | 37 | 14 | 14 |
| YP, lb/100 ft.$^2$ | 73 | 10 | 24 | 13 | 7 | 16 | 51 | 15 | 9 |
| 10 s. Gel, lb/100 ft$^2$ | 18 | 6 | 7 | 4 | 4 | 6 | 11 | 6 | 5 |
| 10 Min, Gel, lb/100 ft$^2$ | 24 | 6 | 9 | 5 | 7 | 8 | 13 | 6 | 6 |
| HTHP @ 250° F., cc/30 | 15.0 | — | 2.0 | — | 20.0 | — | 14.0 | — | 12.0 |
| ES @ 120° F., Volts | 329 | 467 | 258 | 225 | 165 | 382 | 287 | 320 | 258 |

EXAMPLE 5

Drilling Fluid with 25% CaCl$_2$ Brine

A drilling fluid of the present invention was formulated to contain the following:

| | Fluid Formulation | | | | |
|---|---|---|---|---|---|
| | M | N | O | P | Q |
| Bio Base-300, g | 173.7 | 173.7 | 173.7 | 173.7 | 173.7 |
| BENTONE 38, g | 7.0 | 7.0 | 7.0 | 7.0 | 7.0 |
| Lime, g | 2 | 2 | 2 | 2 | 2 |
| Emulphama PG20, g | 10.0 | 10.0 | 10.0 | 10.0 | 10.0 |
| VERSA WET, g | 1.0 | 3.0 | — | — | — |
| VERSA SWA, g | — | — | 0.5 | 0.5 | 1.0 |
| Ecotrol(EMI-526), g | 0.5 | 0.5 | 0.5 | 0.5 | 0.5 |
| Tap water, g | 54.3 | 54.3 | 54.3 | 54.3 | 54.3 |
| CaCl$_2$ (95%), g | 18.1 | 18.1 | 18.1 | 18.1 | 18.1 |
| CaCO$_3$, g | 35 | 35 | 35 | 35 | 35 |
| MI Bar, g | 208.9 | 208.9 | 208.9 | 208.9 | 208.9 |
| REV DUST, % w/w | 5 | — | 5 | — | 5 |
| Class G Cem. % v/v | — | — | — | 10(70 g slurry) | — |
| Zechstein brine. % v/v | — | — | — | — | 10(43 g) |

Upon review of the above data, one of ordinary skill in the art should appreciate that the above-formulated fluids are useful as an invert emulsion drilling fluids.

EXAMPLE 6

Drilling Fluid with 25% CaCl$_2$ Brine

A drilling fluid of the present invention was formulated to contain the following:

| | Fluid Formulation | | | | |
|---|---|---|---|---|---|
| | R | S | T | U | V |
| Bio Base-300, g | 173.7 | 173.7 | 173.7 | 173.7 | 173.7 |
| BENTONE 38, g | 7.0 | 7.0 | 7.0 | 7.0 | 7.0 |
| Lime, g | 2 | 2 | 2 | 2 | 2 |
| Emulphama PG20, g | 10.0 | 10.0 | 10.0 | 10.0 | 10.0 |
| VERSA WET, g | 3.0 | 3.0 | 3.0 | 3.0 | 3.0 |
| VERSA SWA, g | — | 1.0 | 0.5 | 0.5 | 0.5 |
| VERSA WET F, g | 1.5 | 1.5 | 1.5 | — | 2.0 |
| Ecotrol(EMI-526), g | 0.5 | 0.5 | 0.5 | 0.5 | 0.5 |
| Tap water, g | 54.3 | 54.3 | 54.3 | 54.3 | 54.3 |
| CaCl$_2$ (95%), g | 18.1 | 18.1 | 18.1 | 18.1 | 18.1 |
| VERSAMOD, g | — | — | — | 2.0 | 2.0 |
| CaCO$_3$, g | 35 | 35 | 35 | 35 | 35 |
| MI Bar, g | 208.9 | 208.9 | 208.9 | 208.9 | 208.9 |
| REV DUST, % w/w | — | — | — | 5 | — |
| Class G Cem. % v/v | — | — | 10 | — | — |

-continued

| | Fluid Formulation | | | | |
|---|---|---|---|---|---|
| | R | S | T | U | V |
| 1.29 Zechstein brine. % v/v | — | 10 | — | — | — |

The formulated fluid had a mud weight of about 11.8 ppg. Exemplary contaminates were added to each of the fluid formulations in an amount indicated. The initial properties of the fluid were measured and then the fluid was aged at 300° F. shown for 16 hours with rolling. Rheology of the initial fluid and the aged fluid were measured at 120° F. Representative data is given below:

| | Formulation | | | | | | | | |
|---|---|---|---|---|---|---|---|---|---|
| | R | | S | | T | | U | | V |
| | Fluid Properties | | | | | | | | |
| | Initial | Aged | Initial | Aged | Initial | Aged | Initial | Aged | Aged |
| 600 rpm Rheology | 34 | 66 | 36 | 36 | 40 | 82 | 48 | 88 | 210 |
| 300 rpm Rheology | 21 | 41 | 23 | 22 | 26 | 49 | 30 | 52 | 150 |
| 200 rpm Rheology | 15 | 28 | 14 | 12 | 18 | 35 | 21 | 39 | 120 |
| 100 rpm Rheology | 10 | 17 | 10 | 8 | 12 | 22 | 14 | 25 | 80 |
| 6 rpm Rheology | 5 | 3 | 3 | 2 | 5 | 5 | 6 | 8 | 15 |
| 3 rpm Rheology | 4 | 2 | 2 | 1 | 4 | 3 | 5 | 6 | 10 |
| PV., cP | 13 | 25 | 13 | 14 | 14 | 33 | 18 | 36 | 60 |
| Yp, lb/100 ft.$^2$ | 12 | 16 | 10 | 8 | 12 | 16 | 12 | 16 | 90 |
| 10 s. Gel, lb/100 ft$^2$ | 5 | 2 | 4 | 3 | 6 | 4 | 6 | 8 | 13 |
| 10 min, Gel, lb/100 ft$^2$ | 5 | 3 | 5 | 4 | 7 | 6 | 8 | 11 | 19 |
| HTHP @ 250° F., cc/30 | — | 1.8 | — | 5.0 | — | 0.2 | — | 15.0 | 24.0 |
| ES @ 120° F., Volts | 777 | 239 | 338 | 265 | 647 | 292 | 430 | 308 | 367 |

Upon review of the above data, one of ordinary skill in the art should appreciate that the above-formulated fluids are useful as an invert emulsion drilling fluids.

EXAMPLE 7

Drilling Fluid EMULPHARMA PG20 Comparison to VERSACOAT

A drilling fluid of the present invention was formulated to contain the following:

| | Fluid Formulation | |
|---|---|---|
| | W 25% CaCl$_2$Brine | X NOVA PLUS |
| IO C$_{16-18}$, g | — | 150.98 |
| Bio Base-300, g | 173.7 | — |
| VG PLUS, g | — | 4.0 |
| BENTONE 38, g | 12 | — |
| Lime, g | 2 | 2.0 |
| NOVAMUL, g | — | 8.0 |
| NOVAWET, g | — | 3.0 |
| VERSACOAT, g | 8.0 | — |
| VERSAWET, g | 3.0 | — |
| Tap Water | 54.3 | 80.97 |
| CaCl$_2$ (97%), g | 18.1 | 28.5 |
| Ecotrol (EMI-526), g | 0.5 | — |

-continued

| | Fluid Formulation | |
|---|---|---|
| | W 25% CaCl$_2$Brine | X NOVA PLUS |
| CaCO$_3$ M, g | 35 | — |
| Ml Bar, g | 208.9 | 226.54 |

The formulated fluid had a mud weight of about 11.8 ppg. The initial properties of the fluid were measured and then the fluid was aged at 300° F. shown for 16 hours with rolling. Rheology of the initial fluid and the aged fluid were measured at 120° F. Representative data is given below:

| | W | | X |
|---|---|---|---|
| | Fluid Properties | | |
| | Initial | Aged | Initial |
| 600 rpm Rheologies | 36 | 30 | 57 |
| 300 rpm Rheologies | 24 | 20 | 36 |
| 200 rpm Rheologies | 18 | 12 | 28 |
| 100 rpm Rheologies | 12 | 8 | 19 |
| 6 rpm Rheologies | 5 | 3 | 7 |
| 3 rpm Rheologies | 6 | 2 | 6 |
| PV., cP | 12 | 10 | 21 |
| YP, lb/100 ft$^2$ | 12 | 10 | 15 |
| 10 s. Gel, lb/100 ft$^2$ | 6 | 4 | 5 |
| 10 min, Gel, lb/100 t$^2$ | 8 | 5 | 7 |
| HTHP @ 250° F., cc/30 | — | 6.0 | — |
| ES @ 120° F., Volts | 819 | 565 | 842 |

Upon review of the above data, one of ordinary skill in the art should appreciate that the above-formulated fluids are useful as an invert emulsion drilling fluids.

EXAMPLE 8

S/W Ratio Study on EMULPHARMA PG20 with 25% CaCl$_2$ Brine

A drilling fluid of the present invention was formulated to contain the following:

| | Fluid Formulation | | | | |
|---|---|---|---|---|---|
| | Y | Z | AA | BB | CC |
| | | | S/W Ratio | | |
| | (60/40) | (70/30) | (90/10) | (60/40) | (70/30) |
| Bio Base-300, g | 121.08 | 140.34 | 178.12 | 121.08 | 140.34 |
| BENTONE 38, g | 7.0 | 7.0 | 7.0 | 3.5 | 3.5 |
| Lime, g | 2 | 2 | 2 | 2 | 2 |
| Emulpharma PG20, g | 10.0 | 10.0 | 10.0 | 10.0 | 10.0 |
| VERSA WET g | 3.0 | 3.0 | 3.0 | 3.0 | 3.0 |
| 25% CaCl$_2$ brine, g | 141.05 | 105.46 | 35 | 141.05 | 105.46 |
| VERSA VERT F, ppb | 1.5 | 1.5 | 1.5 | 1.5 | 1.5 |
| Ecotrol (EMI-526), g | 0.5 | 0.5 | 0.5 | 0.5 | 0.5 |
| WERSA SWA, g | 2.0 | 2.0 | 2.0 | 2.0 | 2.0 |
| CaCO$_3$, M, g | 35 | 35 | 35 | 35 | 35 |
| MI Bar, g | 182.37 | 199.06 | 231.79 | 182.37 | 199.06 |

The formulated fluid had a mud weight of about 12.0 ppg. The initial properties of the fluid were measured and then the fluid was aged at 250° F. shown for 16 hours with rolling. Rheology of the initial fluid and the aged fluid were measured at 120° F. Representative data is given below:

| | Fluid Formulation | | | |
|---|---|---|---|---|
| | Y | | Z | |
| | Fluid Properties | | | |
| | Initial | Aged | Initial | Aged |
| 600 rpm Rheologies | 148 | >300 | 81 | 232 |
| 300 rpm Rheologies | 100 | 260 | 52 | 168 |
| 200 rpm Rheologies | 83 | Too thick to | 41 | 130 |
| 100 rpm Rheologies | 60 | measure. | 30 | 95 |
| 6 rpm Rheologies | 28 | | 11 | 40 |
| 3 rpm Rheologies | 23 | | 10 | 35 |
| PV., cP | 48 | | 29 | 72 |
| YP, lb/100 Ft$^2$ | 52 | | 23 | 88 |
| 10 s. Gel, lb/100 ft$^2$ | 23 | | 12 | 36 |
| 10 min, Gel, lb/100 t$^2$ | 26 | | 16 | 50 |
| HTHP @ 250° F., cc/30 | — | | — | 1.0 |
| ES @ 120° F., Volts | 610 | 896 | 748 | 617 |

| | Fluid Formulation | | | | | |
|---|---|---|---|---|---|---|
| | AA | | BB | | CC | |
| | Fluid Properties | | | | | |
| | Initial | Aged | Initial | Aged | Initial | Aged |
| 600 rpm Rheologies | 46 | 95 | 90 | >300 | 62 | 165 |
| 300 rpm Rheologies | 30 | 62 | 56 | 210 | 36 | 110 |
| 200 rpm Rheologies | 20 | 50 | 44 | 165 | 26 | 84 |
| 100 rpm Rheologies | 14 | 35 | 32 | 112 | 20 | 50 |
| 6 rpm Rheologies | 6 | 9 | 12 | 26 | 7 | 12 |
| 3 rpm Rheologies | 5 | 6 | 10 | 19 | 5 | 9 |
| PV., cP | 16 | 33 | 34 | — | 24 | 65 |
| YP, lb/100 Ft$^2$ | 14 | 29 | 22 | — | 10 | 45 |
| 10 s. Gel, lb/100 ft$^2$ | 8 | 9 | 11 | 21 | 6 | 12 |
| 10 min, Gel, lb/100 t$^2$ | 10 | 12 | 14 | 38 | 8 | 21 |
| HTHP @ 250° F., cc/30 | — | 0.0 | — | 1.3 | — | 1.4 |
| ES @ 120° F., Volts | 1317 | 1542 | 409 | 736 | 490 | 346 |

Upon review of the above data, one of ordinary skill in the art should appreciate that the above-formulated fluids are useful as an invert emulsion drilling fluids. One would also note that the decreasing of clay concentration is followed by lower rheology properties, formulations BB & CC.

EXAMPLE 8

70/30 S/w ratio and mud weight study on EMULPHARMA PG20

Drilling fluids of the present invention were formulated to contain the following:

| | Fluid Formulation | | | | |
|---|---|---|---|---|---|
| | DD | EE | FF | GG | HH |
| | | | S/W Ratio | | |
| | (90/10) | (70/30) | (70/30) | (70/30) | (70/30) |
| Bio Base-300, g | 178.12 | 153.65 | 127.03 | | 140.34 |
| BENTONE 38, g | 5.0 | 5.0 | 7.0 | 3.5 | 2.0 |
| Lime, g | 2 | 2 | 2 | 2 | 2 |
| Emulpharma PG20, g | 10.0 | 10.0 | 10.0 | 10.0 | 10.0 |
| VERSA WET g | 3 | 3 | 3 | 3 | 3.0 |
| 25% CaCl$_2$ brine, g | 35.0 | 115.07 | 95.14 | 95.14 | 105.4 |
| VERSA VERT F, ppb | 1.5 | 1.5 | 1.5 | 1.5 | — |
| Ecotrol (EMI-526), g | 0.5 | 0.5 | 0.5 | 0.5 | 1.5 |
| WERSA SWA, g | 2.0 | 2.0 | 2.0 | 2.0 | 1.0 |
| CaCO$_3$, M, g | 35 | 35 | 35 | 35 | 35 |
| MI Bar, g | 231.79 | 91.78 | 306.33 | 306.33 | 199.06 |

The formulated fluid had a mud weight as shown. The initial properties of the fluid were measured and then the fluid was aged at 250° F. shown for 16 hours with rolling. Rheology of the initial fluid and the aged fluid were measured at 120° F. Representative data is given below:

| | Fluid Formulation | | | | | |
|---|---|---|---|---|---|---|
| | DD | | EE | | FF | |
| | Fluid Properties | | | | | |
| | Initial | Aged | Initial | Aged | Initial | Aged |
| Mud Weight, ppg | 12.0 | 12.0 | 10.0 | 10.0 | 14.0 | 14.0 |
| 600 rpm Rheologies | 41 | 78 | 53 | 150 | 130 | >300 |
| 300 rpm Rheologies | 25 | 50 | 35 | 100 | 86 | 210 |
| 200 rpm Rheologies | 16 | 38 | 25 | 92 | 69 | 182 |
| 100 rpm Rheologies | 11 | 25 | 18 | 60 | 50 | 135 |
| 6 rpm Rheologies | 5 | 6 | 7 | 22 | 22 | 63 |
| 3 rpm Rheologies | 4 | 4 | 6 | 16 | 20 | 55 |
| PV., cP | 16 | 28 | 18 | 50 | 44 | — |
| YP, lb/100 Ft$^2$ | 9 | 22 | 17 | 50 | 42 | — |
| 10 s. Gel, lb/100 ft$^2$ | 6 | 6 | 7 | 19 | 20 | 60 |
| 10 min, Gel, lb/100 t$^2$ | 7 | 11 | 10 | 29 | 22 | 68 |
| HTHP @ 250° F., cc/30 | — | 1.5 | — | 0.5 | — | — |
| ES @ 120° F., Volts | 1309 | 1115 | 565 | 888 | 822 | 895 |

|  | Fluid Formulation | | | |
|---|---|---|---|---|
|  | GG | | HH | |
|  | Fluid Properties | | | |
|  | Initial | Aged | Initial | Aged |
| Mud Weight, ppg | 14.0 | 14.0 | 12.0 | 12.0 |
| 600 rpm Rheologies | 82 | 188 | 72 | 96 |
| 300 rpm Rheologies | 52 | 120 | 50 | 56 |
| 200 rpm Rheologies | 40 | 95 | 40 | 44 |
| 100 rpm Rheologies | 28 | 62 | 30 | 27 |
| 6 rpm Rheologies | 10 | 19 | 10 | 7 |
| 3 rpm Rheologies | 9 | 13 | 8 | 5 |
| PV., cP | 30 | 68 | 22 | 40 |
| YP, lb/100 Ft$^2$ | 22 | 52 | 28 | 16 |
| 10 s. Gel, lb/100 ft$^2$ | 10 | 19 | 8 | 9 |
| 10 min, Gel, lb/100 t$^2$ | 10 | 25 | 11 | 15 |
| HTHP @ 250° F., cc/30 | — | 4.4 | — | 3.0 |
| ES @ 120° F., Volts | 670 | 708 | 641 | 847 |

Upon review of the above data, one of ordinary skill in the art should appreciate that the above-formulated fluids are useful as an invert emulsion drilling fluids. It should also be noted that decreasing the concentration of the clay lowered rheology, formulation GG.

EXAMPLE 9

70/30 & 80/20 SWR with 25% CaCl$_2$ Brine

Drilling fluids of the present invention were formulated to contain the following:

|  | Fluid Formulation | |
|---|---|---|
|  | II | JJ |
|  | S/W Ratio | |
|  | (70/30) | (80/20) |
| Bio Base-300, g | 140.3 | 173.0 |
| BENTONE 38, g | 2.0 | 12.0 |
| Lime, g | 2 | 2 |
| GS-17 29 | 10.0 | 10.0 |
| VERSA WET g | 3 | 3 |
| 25% CaCl$_2$ brine, g | 105.4 | 72.4 |
| VERSA VERT F, ppb | 1.5 | 1.5 |
| Ecotrol (EMI-526), g | — | 0.5 |
| VERSA SWA, g | 1.0 | — |
| CaCO$_3$, M, g | 35 | 35 |
| MI Bar, g | 199.06 | 208.9 |

The formulated fluid had a mud weight as shown. The initial properties of the fluid were measured and then the fluid was aged at 250° F. shown for 16 hours with rolling. Rheology of the initial fluid and the aged fluid were measured at 120° F. Representative data is given below:

|  | Fluid Formulation | | | |
|---|---|---|---|---|
|  | II | | JJ | |
|  | Fluid Properties | | | |
|  | Initial | Aged | Initial | Aged |
| Mud Weight, ppg | 12.0 | 12.0 | 10.0 | 10.0 |
| 600 rpm Rheologies | 69 | 100 | 120 | 120 |
| 300 rpm Rheologies | 47 | 65 | 34 | 82 |
| 200 rpm Rheologies | 40 | 51 | 24 | 67 |
| 100 rpm Rheologies | 28 | 36 | 15 | 47 |
| 6 rpm Rheologies | 7 | 20 | 6 | 22 |
| 3 rpm Rheologies | 5 | 18 | 5 | 20 |
| PV., cP | 22 | 35 | 20 | 43 |
| YP, lb/100 Ft$^2$ | 25 | 30 | 14 | 39 |
| 10 s. Gel, lb/100 ft$^2$ | 5 | 21 | 6 | 27 |
| 10 min, Gel, lb/100 t$^2$ | 8 | 29 | 10 | 35 |
| HTHP @ 250° F., cc/30 | — | 7.0 | — | 1.2 |
| ES @ 120° F., Volts | 347 | 681 | 677 | 1617 |

Upon review of the above data, one of ordinary skill in the art should appreciate that the above-formulated fluids are useful as an invert emulsion drilling fluids. It should also be noted that decreasing the concentration of the clay lowered rheology, formulation GG.

In view of the above disclosure, one of ordinary skill in the art should understand and appreciate that one illustrative embodiment of the present invention includes an invert emulsion drilling fluid that is formulated to include: an oleaginous continuous phase, a non-oleaginous discontinuous phase a surfactant that is a fatty acid ester of diglycerol or triglycerol, and a weighting agent. In one such illustrative embodiment, the surfactant is a di-fatty acid ester of diglycerol in which the fatty acid has the formula RCO$_2$H and the R is an alkyl or alkenyl having 10 to 20 carbon atoms. Alternatively, the surfactant is a di-fatty acid ester of triglycerol in which the fatty acid has the formula RCO$_2$H and the R is an alkyl or alkenyl having 10 to 20 carbon atoms. More preferably the surfactant is selected from polyglyceryl-2 diisostearate or polyglyceryl-3 diisostearate or mixtures and combinations of these. One of skill in the art should appreciate that the oleaginous fluid may be selected from a variety of suitable fluids known in the art, including diesel oil, mineral oil, synthetic oil, ester oils, glycerides of fatty acids, aliphatic esters, aliphatic ethers, aliphatic acetals, or other such hydrocarbons and combinations and mixtures of these and similar fluids. In a similar manner, the non-oleaginous phase may be selected from a wide range of suitable fluids known in the art including fresh water, sea water, brine, aqueous solutions containing water soluble organic salts, water soluble alcohols or water soluble glycols or combinations and mixtures of these and similar fluids. The weighting agent component of such an illustrative drilling fluid can be either a water soluble weighting agent or a water insoluble weighting agent or combinations and mixtures of these two. In one illustrative embodiment, the water insoluble weighting agent is selected from barite, calcite, mullite, gallena, manganese oxides, iron oxides, or combinations and mixtures of these and similar solid materials used to weight drilling fluids. In another illustrative embodiment, the water soluble weighting agent is selected from water soluble salts of zinc, iron, barium, calcium or combinations and mixtures of these in aqueous solutions used to add weight to drilling fluids.

It should further be appreciated that another illustrative embodiment of the present invention includes an invert emulsion drilling fluid formulated to include: an oleaginous continuous phase, a non-oleaginous discontinuous phase, a biodegradable surfactant including a di-fatty acid ester of diglycerol, and a weighting agent. In such instances, the fatty acid preferably has the formula $RCO_2H$ in which R is an alkyl or alkenyl having 10 to 20 carbon atoms. More preferably the di-fatty acid ester of diglycerol is a polyglyceryl-2 diisostearate.

Yet another illustrative embodiment of the present invention includes an invert emulsion drilling fluid that includes: an oleaginous continuous phase, a non-oleaginous discontinuous phase, a biodegradable surfactant including a di-fatty acid ester of triglycerol in which the fatty acid has the formula $RCO_2H$ and R is an alkyl or alkenyl having 10 to 20 carbon atoms, and a weighting agent. It is preferred that the di-fatty acid ester of triglycerol is polyglyceryl-3 diisostearate.

It will also be appreciated by one or ordinary skill in the art that a present illustrative embodiment of the present invention includes a method of formulating an invert emulsion drilling fluid so as to exhibit the characteristics of the above described fluids. One such illustrative method, includes mixing an oleaginous fluid, a non-oleaginous fluid, a biodegradable surfactant and a weighting agent to form and invert emulsion. The biodegradable surfactant includes a fatty acid ester of diglycerol or triglycerol in amounts sufficient to form an invert emulsion in which the oleaginous fluid is the continuous phase and the non-oleaginous fluid is the discontinuous phase. In one preferred illustrative embodiment the fatty acid ester is a di-fatty acid ester of diglycerol in which fatty acid has the formula $RCO_2H$ and R is an alkyl or akenyl having 10 to 20 carbon atoms. In another preferred illustrative embodiment, a di-fatty acid ester of triglycerol is utilized in which the fatty acid has the formula $RCO_2H$ and R is an alkyl or alkenl having 10 to 20 carbon atoms. The oleaginous fluid is preferably selected from diesel oil, mineral oil, synthetic oil, ester oils, glycerides of fatty acids, aliphatic esters, aliphatic ethers, aliphatic acetals, or other such hydrocarbons and combinations and mixtures of these and similar fluids Similarly, the non-oleaginous phase is preferably selected from fresh water, sea water, brine, aqueous solutions containing water soluble organic salts, water soluble alcohols or water soluble glycols or combinations and mixtures of these and similar fluids. In one preferred illustrative embodiment, the weighting agent is either a water soluble weighting agent or a water insoluble weighting agent or combinations and mixtures of the two. In such cases, the water insoluble weighting agent is preferably barite, calcite, mullite, gallena, manganese oxides, iron oxides, or combinations and mixtures of these and similar weight materials while the water soluble weighting agent is preferably selected from water soluble salts of zinc, iron, barium, calcium or combinations and mixtures of these and similar materials.

It should also be appreciated that the present invention encompasses a method of drilling a subterranean hole with the invert emulsion drilling fluids as described above, such an illustrative method includes: mixing an oleaginous fluid, a non-oleaginous fluid, a biodegradable surfactant, and a weighting agent to form an invert emulsion, and drilling said subterranean hole using said invert emulsion as the drilling fluid. It is preferred that the biodegradable surfactant is a fatty acid ester of diglycerol or triglycerol that is present in amounts sufficient to form an invert emulsion in which the oleaginous fluid is the continuous phase and the non-oleaginous fluid is the discontinuous phase. In a more preferred embodiment, the fatty acid ester of diglycerol or triglycerol is a di-fatty acid ester of diglycerol in which the fatty acid has the formula $RCO_2H$ and the R is an alkyl or alkenyl having 10 to 20 carbon atoms. Alternatively, the fatty acid ester of diglycerol or triglycerol may be a di-fatty acid ester of triglycerol in which fatty acid has the formula $RCO_2H$ and the R is an alkyl or akenyl having 10 to 20 carbon atoms. As disclosed above, the oleaginous fluid is preferably selected from diesel oil, mineral oil, synthetic oil, ester oils, glycerides of fatty acids, aliphatic esters, aliphatic ethers, aliphatic acetals, or other such hydrocarbons and combinations and mixtures of these and similar fluids. The non-oleaginous phase is preferably selected from fresh water, sea water, brine, aqueous solutions containing water soluble organic salts, water soluble alcohols or water soluble glycols or combinations and mixtures of these and similar fluids. The weighting agent can be a water-soluble weighting agent or a water insoluble weighting agent or combinations of the two. Preferably the water insoluble weighting agent is selected from barite, calcite, mullite, gallena, manganese oxides, iron oxides, or combinations and mixtures of these and similar weighting agents. While the water soluble weighting agent is selected from water soluble salts of zinc, iron, barium, calcium or combinations and mixtures of these and similar weighting agents.

Also encompassed is a method of drilling a subterranean well with an invert emulsion drilling fluid, said method comprising: mixing an oleaginous fluid, a non-oleaginous fluid, a biodegradable surfactant, and a weighting agent to form an invert emulsion, circulating said invert emulsion within said subterranean well and drilling said subterranean well using said invert emulsion as the drilling fluid. In such an illustrative embodiment, the biodegradable surfactant includes a fatty acid ester of diglycerol, in which the fatty acid has the formula $RCO_2H$ and R is an alkyl or alkenyl having 10 to 20 carbon atoms. The biodegradable surfactant is in amounts sufficient to form an invert emulsion in which the oleaginous fluid is the continuous phase and the non-oleaginous fluid is the discontinuous phase. It is preferred that the fatty acid ester of diglycerol is a di fatty acid ester and more preferably the fatty acid ester of diglycerol is polyglyceryl-2 diisostearate.

Another illustrative embodiment includes a method of drilling a subterranean well with an invert emulsion drilling fluid, in which the method includes: mixing an oleaginous fluid, a non-oleaginous fluid, a biodegradable surfactant, and a weighting agent to form an invert emulsion, circulating said invert emulsion within said subterranean well and drilling said subterranean well using said invert emulsion as the drilling fluid. As part of the illustrative method, the biodegradable surfactant includes a fatty acid ester of triglycerol having the formula $RCO_2H$ in which the R is an alkyl or alkenyl having 10 to 20 carbon atoms. The biodegradable surfactant is in amounts sufficient to form an invert emulsion in which the oleaginous fluid is the continuous phase and the non-oleaginous fluid is the discontinuous phase. It is preferred that the fatty acid ester of triglycerol is a di-fatty acid ester and more preferably the fatty acid ester of triglycerol is polyglyceryl-3 diisostearate.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An invert emulsion drilling fluid comprising
   an oleagnous continuous phase
   a non-oleaginous discontinuous phase
   a polyglyceryl-2 diisosterate surfartant, and
   a weighting agent.

2. The drilling fluid of claim 1 wherein the oleaginous fluid is selected from diesel oil, mineral oil, synthetic oil, ester oil, glycerides of fatty acids, aliphatic estes, aliphiatic ethers, aliphatic acetals, and combinations thereof.

3. The drilling fluid of claim 1 wherein the non-oleaginous phase is selected from fresh water, sea water, brine, aqueous solutions containing water soluble organic salts, water soluble alcohols or water soluble glycols or combinations thereof.

4. The drilling fluid of claim 1 wherein the weighting agent is a water soluble weighting agent or a water insoluble weighting agent or combinations thereof.

5. The drilling fluid of claim 4 wherein the water insoluble weighting agent is selected from barite, calcite, mullite, gallena, manganese oxides, iron oxides, or combinations thereof.

6. The drilling fluid of claim 4 wherein the water soluble weighting agent is selected from water soluble salts of zinc, iron, barium, calcium or combinations thereof.

7. A method of formulating an invert emulsion drilling fluid, said method comprising:
   mixing an oleaginous fluid, a non-oleaginous fluid, a biodegradable surfactant and a weighting agent, wherein the biodegradable surfactant is selected from polyglyceryl-2 diisostearate or in amounts sufficient to form an invert emulsion in which the oleaginous fluid is the continuous phase and the non-oleaginous fluid is the discontinuous phase.

8. The method of claim 7 wherein the oleaginous fluid is selected from diesel oil, mineral oil, synthetic oil, ester oils, glycerides of fatty acids, aliphatic esters, aliphatic ethers, aliphatic acetals, and combinations thereof.

9. The method of claim 7 wherein the non-oleaginous phase is selected from fresh water, sea water, brine, aqueous solutions containing water soluble organic salts, water soluble alcohols or water soluble glycols or combinations thereof.

10. The method of claim 7 wherein the weighting agent is a water soluble weighting agent or a water insoluble weighting agent or combinations thereof.

11. The method of claim 10 wherein the water insoluble weighting agent is selected from barite, calcite, mullite, gallena, manganese oxides, iron oxides, or combinations thereof.

12. The method of claim 10 wherein the water soluble weighting agent is selected from water soluble salts of zinc, iron, barium, calcium or combinations thereof.

13. A method of drilling a subterranean hole with an invert emulsion drilling fluid, said method comprising:
    mixing an oleaginous fluid, a non-oleaginous fluid, a biodegradable surfactant, and a weighting agent to form an invert emulsion, wherein the biodegradable surfactant is polyglyceryl-2 diisostearate and wherein the biodegradable surfactant is in amounts sufficient to form an invert emulsion in which the oleaginous fluid is the continuous phase and the non-oleaginous fluid is the discontinuous phase, and
    drilling said subterranean hole using said invert emulsion as the drilling fluid.

14. The method of claim 13 wherein the oleaginous fluid is selected from diesel oil, mineral oil, synthetic oil, ester oils, glycerides of fatty acids, aliphatic esters, aliphatic ethers, aliphatic acetals, and combinations thereof.

15. The method of claim 13 wherein the non-oleaginous phase is selected from fresh water, sea water, brine, aqueous solutions containing water soluble organic salts, water soluble alcohols or water soluble glycols or combinations thereof.

16. The method of claim 13 wherein the weighting agent is a water soluble weighting agent or a water insoluble weighting agent or combinations thereof.

17. The method of claim 16 wherein the water insoluble weighting agent is selected from barite, calcite, mullite, gallena, manganese oxides, iron oxides, or combinations thereof.

18. The method of claim 16 wherein the water soluble weighting agent is selected from water soluble salts of zinc, iron, barium, calcium or combinations thereof.

19. A method of drilling a subterranean well with an invert emulsion drilling fluid, said method comprising:
    mixing an oleaginous fluid, a non-oleaginous fluid, a biodegradable surfactant, and a weighing agent to form an invert emulsion, wherein the biodegradable surfactant is in amounts sufficient to form an invert emulsion in which the oleaginous fluid is the continuous phase and the non-oleaginous fluid is the discontinuous phase,
    circulating said invert emulsion within said subterranean well and
    drilling said subterranean well using said invert emulsion as the drilling fluid;
    wherein the biodegradable surface is polyglyceryl-2 diisostearate.

* * * * *